UNITED STATES PATENT OFFICE.

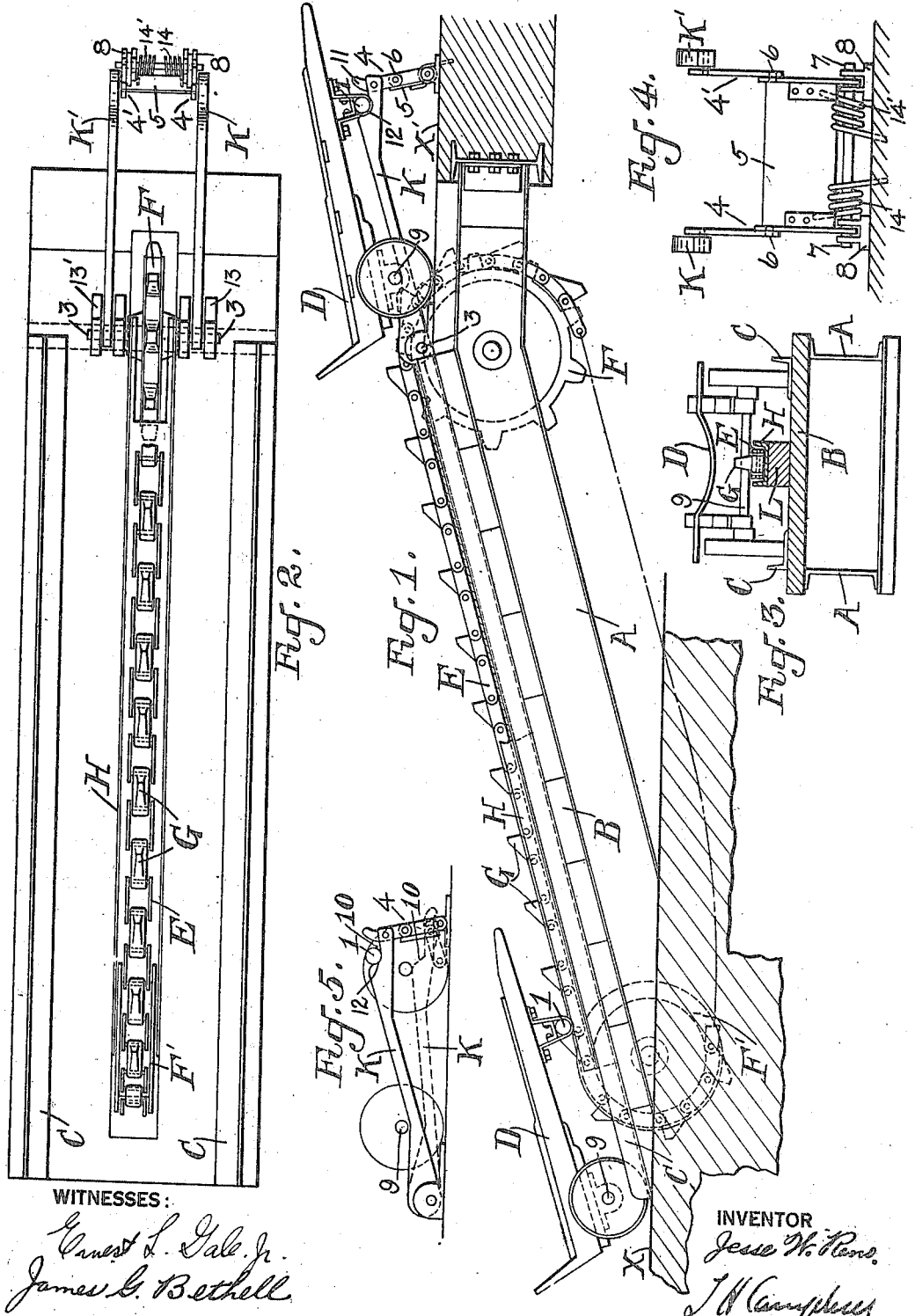

JESSE W. RENO, OF NEW YORK, N. Y., ASSIGNOR TO OTIS ELEVATOR COMPANY, OF JERSEY CITY, NEW JERSEY, A CORPORATION OF NEW JERSEY.

ENDLESS CONVEYER.

1,255,339.  Specification of Letters Patent.  Patented Feb. 5, 1918.

Application filed May 6, 1916.  Serial No. 95,771.

*To all whom it may concern:*

Be it known that I, JESSE W. RENO, a citizen of the United States, residing in New York, in the county of New York and State of New York, have invented a new and useful Improvement in Endless Conveyers, of which the following is a specification.

My invention relates to endless conveyers more particularly of the type adapted for use in transporting two wheeled vehicles or hand trucks.

More essentially the invention consists in providing in conjunction with a conveyer of the above-noted type, a device to receive trucks from the conveyer, guide the handles of the truck to an elevated position, and support the handles in such position, so as to make it unnecessary for a truckman to stoop to raise the handles of the truck when delivered from the conveyer.

The invention further consists in providing the truck receiving device with what may be termed a safety mechanism, which operates automatically to release the truck from the receiving device and permits the truck to be pushed or advanced by a following truck, in the event of the first named truck not being removed from the receiver.

In the accompanying drawings, Figure 1, is a side elevational view of the conveyer together with the truck receiving mechanism, showing the mode of operation thereof; Fig. 2 illustrates in plan view, the conveyer and truck receiving mechanism; Fig. 3 illustrates an end section of Fig. 1; Fig. 4 illustrates an enlarged view of the truck receiving mechanism, and Fig. 5 illustrates a side view of the truck receiving device.

The apparatus consists of a pair of spaced channel irons A forming a frame work provided with a flooring B, and a pair of spaced angle irons C, the latter forming a trackway or guide for the wheels of a carrier which in the present instance is in the form of a two-wheeled hand truck D.

A single endless chain E passes around a sprocket wheel F, and an idler F' the sprocket wheel being driven continuously by any suitable source of power.

The endless chain is provided with projecting lugs or teeth G, adapted to engage a transverse bar 1, secured to the carrier or hand truck D, and is slidably supported on is upper or working run by a channel beam H, bolted to a member L. The truck transporting means or endless chain E is illustrated herein as connecting or extending between points at different levels such as X, X', but it will be understood that these transporting means may connect different points which are on substantially the same level.

Coming now to the apparatus which forms more particularly the subject matter of the present invention, it comprises an inclined guideway consisting of a pair of spaced bars K, K', positioned at the discharge end of the conveyer, which in the present instance we will assume is at the upper floor X'. The bars at one end are pivotally supported at point 3, by brackets 13, 13', secured to the floor. The bars at their other end are connected to a pair of arms or links 4, 4', which links, together with a connecting plate 5, form a rule joint, or knuckle at the point 6, and these elements as a whole form a toggle mechanism. The lowermost links of each pair 4, 4', are pivotally connected at point 7, to brackets 8, secured to the floor. Coil springs 14, 14', act through the toggle mechanism to maintain or support the bars K, K', in a normal or inclined position as indicated in Fig. 1, and also by the full lines in Fig. 5.

The apparatus in operation is as follows: The carrier or hand truck is brought to the lower end of the incline by the truckman, who connects the truck with the movable endless chain E by lowering the handles so that the bar 1 is engaged by one of the lugs G. The truck is moved along the incline by the chain E without the necessity of a truckman accompanying the same. It will be noted that the distance between the bar 1 and the wheel axle 9 is such as to allow the axle to attain a position in front of one of the lugs G.

When the truck reaches the upper end of the run or incline, it is automatically discharged or deposited on the receiving device by the chain. In this operation the bar 1 is deposited by the chain onto the spaced bars K, K'. The lug disengages the bar 1, and the truck is then pushed forward, or advanced by the lug which is back of the axle 9, the bar 1 sliding on the top face of the inclined spaced bars, and dropping into a notch, such as 10, provided on the arms K, K'. The bar, engaging the notch 10 prevents movement of the truck backwardly, and the faces 12 which form the notch, being somewhat inclined, urge the truck forward a slight amount, so that the lugs on the chain will not at this time contact or engage the axle 9.

In this manner the truck is automatically discharged or delivered to the receiving device and the handles of the truck guided to, and supported in an elevated position, which elevation is substantially the same, as when the truck is being hauled by a truckman. The truck is removed from the receiving device by the truckman pressing with his foot against the plate 5, thereby actuating the toggle mechanism, and as the truckman simultaneously draws the truck forward, the bar 1 riding on the top face of the bars K, K', rocks the latter on their pivots 3 (as illustrated in dotted lines in Fig. 5), until the truck is drawn from the receiver. When this is accomplished the bars K, K', are moved to their normal inclined position through the action of the coil springs 14, 14', and the toggle mechanism.

Thus far, it will be seen that the truck receiving device, will maintain or support the handles of the truck in a convenient position for the truckman to grasp without stooping, and by this means, time and labor will be saved.

A safety mechanism is provided which is controllable by the truck to actuate the toggle mechanism of the receiving device and permit the truck to be pushed or advanced from the receiving device by a following truck, this being effected in case the latter named truck reaches the upper landing before the truckman removes the truck from the receiving device. To accomplish this result, I provide members such as 11, 11', which may form an integral part of the top links of the toggle-mechanism, these members projecting above the top faces of the bars K, K', and being adapted for engagement by the bar 1 of the truck. The truck on the receiving device being advanced by the following truck, causes the bar 1 to engage the projections 11, 11', and thereby actuate the toggle-mechanism, which is caused to collapse together with the arms K, K', due to the weighted truck. In this manner the truck is automatically released from the receiving device and pushed or advanced along the floor, by the said following truck.

Having thus described my invention, and without limiting myself to the precise details of construction and arrangement of parts, what I claim and desire to secure by Letters Patent of the United States is:—

1. In truck conveying apparatus, the combination of an endless, continuous traveling conveyer, and means at one end of the conveyer inclined to elevate one end of a truck as the latter is discharged from the conveyer.

2. In a hand truck conveying apparatus, the combination of a traveling inclined conveyer, and means, independent of the conveyer, at the upper end thereof, to sustain the front end of the truck, as the truck is discharged from the conveyer, in an inclined position, at a height suitable for a truckman to grasp its handles without stooping down to lift the front end of the truck from the floor.

3. In a hand truck conveying apparatus, the combination of a traveling inclined conveyer, and means, comprising a guide way, independent of the conveyer, at the upper end thereof, to sustain the front end of the truck, as the truck is discharged from the conveyer, in an inclined position, at a height suitable for a truckman to grasp its handles without stooping down to lift the front end of the truck from the floor.

4. In apparatus of the class described, the combination with a conveyer chain, a truck movable with the chain, and inclined means at the discharge end of the conveyer to discharge one end of the truck from the chain and guide the same to an elevated position.

5. In apparatus of the class described, the combination with an endless conveyer, a truck movable with the conveyer, and collapsible means to support one end of the truck.

6. In apparatus of the class described, the combination with an endless conveyer, a truck movable with the conveyer, and collapsible means forming a stationary guideway to support one end of the truck.

7. In apparatus of the class described, the combination with an endless conveyer, a truck movable with the conveyer, means to guide one end of the truck, and collapsible means to support the said means.

8. In apparatus of the class described, the combination with an endless conveyer, a pivoted member forming an extension of the conveyer, and collapsible means to support the said member in normally inclined position.

9. In apparatus of the class described, the combination with a conveyer chain, a pivoted member positioned at the discharge end of the chain, and collapsible means rigidly to support the said member in an inclined position.

10. In apparatus of the class described, the combination with a conveyer chain, a pivoted member positioned at one end of the conveyer, and a toggle mechanism to support the said member in an inclined position.

11. In apparatus of the class described, the combination with a conveyer chain, a pivoted member positioned at the discharge end of the conveyer, and a spring actuated toggle mechanism to support the said member in an inclined position.

12. In apparatus of the class described, the combination with a conveyer chain, spaced members pivoted at the discharge end of the conveyer, and a spring actuated toggle mechanism to support the said members in an inclined position.

13. In apparatus of the class described, the combination with an endless conveyer, a truck movable with the conveyer, means to receive the truck from the conveyer, and means operable by the truck to release the truck from the receiving means.

14. In apparatus of the class described, the combination with an endless conveyer, a truck movable with the conveyer, a collapsible device to discharge one end of the truck from the conveyer, and means operable by an advance movement of the said truck to cause the said device to collapse.

15. In apparatus of the class described, the combination with an endless conveyer, a truck movable with the conveyer, means to discharge one end of the truck from the conveyer and guide the same to an elevated position, and means controlled by the truck to support the first named means in an inclined position.

16. In apparatus of the class described, the combination with an endless conveyer, a truck movable with the conveyer, means to receive the truck from the conveyer, and collapsible means controlled by the truck to support the first named means in an inclined position.

17. In apparatus of the class described, the combination with an endless conveyer, a truck movable with the conveyer, a device to receive one end of the truck from the conveyer and support the same in an elevated position, a collapsible member to support the said device, and means operable by the truck to control the collapsible member.

18. In apparatus of the class described, the combination with an endless conveyer, a truck movable with the conveyer, a device to discharge one end of the truck from the conveyer, and guide the same to an elevated position, a collapsible member to support the said device in an inclined position, and means operable by the truck to actuate the collapsible member.

19. In truck conveying apparatus, the combination of an endless, continuous traveling conveyer, and a truck comprising means independently to engage the conveyer to effect movement of the truck therewith.

20. In truck conveying apparatus, the combination of an endless, continuous traveling conveyer, and a truck comprising members adapted independently to engage the conveyer to move the truck therewith.

21. In truck conveying apparatus, the combination of an endless, continuous traveling conveyer, and a truck comprising a member adapted for engagement with the conveyer, and a second member adapted for engagement with the conveyer when the first named member disengages the conveyer.

22. In truck conveying apparatus, the combination of an endless, continuous traveling conveyer, and a two-wheeled handtruck comprising a member adapted for engagement with a conveyer to effect movement of a truck therewith, and a second member operable when the conveyer disengages the first named member to engage with the member to effect movement with the truck therefor.

23. In truck conveying apparatus, the combination of an endless, continuous traveling conveyer, and a two-wheeled handtruck comprising a member adapted to engage the conveyer and to support the free end of a truck, and a second member adapted to be engaged by the conveyer when the latter, at a discharge point, disengages the first named member.

In testimony whereof, I have signed my name to this specification in the presence of two subscribing witnesses.

JESSE W. RENO.

Witnesses:
   ERNEST L. GALE, Jr.,
   JAMES G. BETHELL.